United States Patent

[11] 3,571,617

[72] Inventor Josef Hainz
 Ottobrunn, Germany
[21] Appl. No. 682,815
[22] Filed Nov. 14, 1967
[45] Patented Mar. 23, 1971
[73] Assignee Bolkow Gesellschaft mit beschrankter Haftung,
 Ottobrunn, near Munich, Germany
[32] Priority Nov. 19, 1966
[33] Germany
[31] B89909

[54] EXTERNALLY CONTROLLED SAWTOOTH GENERATOR WITH VARIABLE PULSE DURATION AND CONSTANT AMPLITUDE
9 Claims, 11 Drawing Figs.
[52] U.S. Cl.......................................... 307/228,
 307/229, 328/181, 328/185
[51] Int. Cl. ....................................... H03k 4/50
[50] Field of Search............................ 328/181–
 –185; 307/228, 229, 263

[56] References Cited
UNITED STATES PATENTS
| | | | |
|---|---|---|---|
| 2,492,018 | 12/1949 | Sunstein | 328/183X |
| 2,562,188 | 7/1951 | Hance | 328/185 |
| 2,581,199 | 1/1952 | Moe | 328/185X |
| 2,596,167 | 5/1952 | Philpott | 328/185 |
| 2,645,715 | 7/1953 | Weller, Jr. et al | 328/183X |
| 2,854,575 | 9/1958 | Richardson | 328/181 |
| 3,217,271 | 11/1965 | Autorino et al | 328/185X |
| 3,373,377 | 3/1968 | Townsend | 328/185X |

Primary Examiner—Stanley D. Miller, Jr.
Attorney—McGlew and Toren

ABSTRACT: A circuit arrangement for producing a sawtooth voltage, of constant amplitude and a variable slope of the front flank by charging and discharging a condenser. To maintain the amplitude of the sawtooth voltage constant with a varying periodic time of a cycle determined by a synchronizing signal having a certain periodic time, first circuit means produce a voltage corresponding to the respective periodic time of the synchronizing signal, second circuit means store this voltage during a cycle, and additional circuit means control the charging current of the condenser as a function of this voltage. The charging current of each sawtooth voltage cycle or pulse is always controlled by the voltage derived from a preceding cycle or pulse of the synchronizing voltage.

In order to keep the error, appearing with relatively rapid frequency variations with corresponding rapid variations of the periodic time of the synchronizing voltage, in the instantaneous voltage course of the sawtooth signal, negligibly small, additional circuit means add, to a cycle of the synchronizing signal, a differential voltage derived from the aforementioned voltage and the voltage corresponding to a respective preceding cycle. This additional circuit means adds a certain "lead" to the variation of the slope of the sawtooth signal.

3,571,617

INVENTOR
Josef Hainz

EXTERNALLY CONTROLLED SAWTOOTH GENERATOR WITH VARIABLE PULSE DURATION AND CONSTANT AMPLITUDE

BACKGROUND OF THE INVENTION

Circuit arrangements for producing sawtooth voltages operate on the principle of charging a condenser from a current source and discharging the condenser through a discharge circuit utilizing the effect that a condenser charged with constant current varies its voltage linearly. The voltage across the condenser is tapped to provide the sawtooth voltage. For varying the sawtooth voltage, it is known to vary the capacity of the condenser, the resistance in the charging circuit, or both, so that the time constant controlling the charging of the condenser is variable. For example, see German Pat. No. 1,138,095.

The periodic time of the cycle, which is the frequency of the sawtooth voltage, also varies, because the peak value of the sawtooth voltage is attained either earlier or later. When the peak value of the sawtooth voltage is attained, the condenser is discharged to produce the rear or trailing flank of the sawtooth signal or pulse.

In guiding missiles, each rotating about its own axis with a certain rolling frequency, it has been proposed to use a linear sawtooth signal of constant amplitude to determine the instantaneous angular position of the missile about its axis. The rotating missile produces, at the end of a full revolution, a reference pulse, so that the cycle of the reference pulse corresponds to a rotation of the missile through 360°.

In order to determine the rotary positions of the missile between the 0 and 360° positions, a linear sawtooth voltage of constant amplitude is derived from the reference pulse, which has the same phase and frequency as the reference signal. A definite angular position of the missile, corresponding to a definite angle of rotation of the missile, is associated with each respective instantaneous value of the linear sawtooth voltage. However, since the rolling frequency of the missile is not constant in each flying phase, both the frequency and the cycle of the reference signal vary, resulting in variation of the sawtooth voltage. Nevertheless, since the slope of the sawtooth voltage determined by the charging time constant is constant, the amplitude of the sawtooth voltage likewise varies with variation of the frequency, so that the respective angular position of the missile can no longer be determined with sufficient accuracy.

In guiding missiles, and in other applications of control and regulating technique, extremely linear sawtooth voltages are consequently required, and these must have respective instantaneous voltages which are the same for any value of a cycle, and thus independent of the frequency of each cycle. In an arbitrary variation of the sawtooth voltage caused, for example, by a synchronizing signal, that is, with a different cycle, the slope of the sawtooth voltage must also be varied correspondingly so that the peak value of the sawtooth voltage, attained at the end of each cycle, is constant.

SUMMARY OF THE INVENTION

This invention relates to the generation of sawtooth voltages and, more particularly, to an improved and simplified circuit arrangement for producing a sawtooth voltage of constant amplitude and variable slope of the front flanks of sawtooth pulses, by charging and discharging a condenser.

In accordance with the invention, such a circuit arrangement is provided and works with a very short delay time to so vary the respective slopes of sawtooth voltages or pulses, to the extent of available duration of a cycle as determined, for example, by a synchronizing signal, and hence the frequency of the sawtooth voltage, that the values of the respective instantaneous voltages of the sawtooth pulses are the same for all cycles for any value between 0 and $2\pi$ of a cycle and independent of the duration of the cycle.

The basis of the invention improvement is a circuit arrangement for producing sawtooth voltages of constant amplitude and variable slope of the front flanks of pulses by charging and discharging a condenser. In accordance with the invention, in order to keep the amplitude of the sawtooth voltage constant with varying duration or periodic time of a cycle determined by a synchronizing signal with a predetermined periodic time, first circuit means are provided for producing a voltage corresponding to the respective periodic time of the synchronizing signal, second circuit means are provided for storing this voltage during a cycle, and additional circuit means are provided for controlling the charging current of the condenser as a function of this voltage. The charging current of a sawtooth voltage cycle or pulse is always controlled by the voltage derived from a preceding cycle or pulse of the synchronizing voltage.

Using the circuit arrangement of the invention, it is possible to set the slope of the sawtooth voltage pulses exactly according to the amplitude of the respective preceding pulse, in order to maintain the amplitude of the sawtooth voltage pulses automatically constant with varying periodic times as determined by a synchronizing signal. Thus, in the case of a frequency variation of the synchronizing signal, and thus of a frequency variation of the sawtooth voltage or signal, the respective instantaneous voltages of the sawtooth signal pulses as determined by the slope of the front flank thereof differ only by the variation of the periodic time in two successive cycles.

In the invention circuit arrangement, an analogous value corresponding to the cycle of the synchronizing cycle is formed by a simple and reliable circuit means, and appears in the form of a voltage. This voltage is stored and is available in the next cycle of the synchronizing signal, and thus for the next or succeeding sawtooth signal pulse, for controlling the charging current of the condenser used for producing the sawtooth voltage. During each cycle, the condenser is fed or supplied with a constant charging current whose amplitude, for a respective pulse, is determined, however, by the duration of a respective preceding pulse.

In order to keep the error, appearing with relatively rapid frequency variations and thus rapid variations in the oscillation time of the synchronizing signal, in the instantaneous voltage value of a sawtooth signal negligibly small, additional circuit means are provided, in accordance with a feature of the invention, to add, to a cycle of the synchronizing signal, a differential voltage derived from the initial voltage and the voltage corresponding to the respective preceding cycle of the synchronizing voltage. By virtue of such additional circuit means, a certain "lead" is added to the variation of the slope of the sawtooth signal pulse, and resulting from a current variation of the duration of the cycle. The amplitude of this "lead" depends on the relative variation of the duration from cycle-to-cycle of the synchronizing signal.

An object of the present invention is to provide an improved circuit arrangement for generating sawtooth voltages and working with a very short delay time as well as being operable to vary the respective slopes of sawtooth voltage pulses to the extent of the available duration of a cycle as determined, for example, by a synchronizing signal.

A further object of the invention is to provide a circuit arrangement for producing sawtooth voltages in which the amplitude of the respective instantaneous voltages of the sawtooth signals or pulses is the same for all cycles for any value between 0 and $2\pi$ of a cycle and independent of the duration of a cycle.

Another object of the invention is to provide such a circuit arrangement including first circuit means for producing a voltage corresponding to the respective periodic tim of oscillation of a synchronizing signal, second circuit means for storing this voltage during a cycle, and additional circuit means for controlling the charging current of the condenser as a function of this voltage.

Still another object of the invention is to provide such a circuit arrangement in which the charging current of a sawtooth voltage cycle or pulse is always controlled by the voltage derived from a preceding cycle of the synchronizing voltage.

A further object of the invention is to provide such a circuit arrangement with which it is possible to adjust the slope of the sawtooth voltage pulses exactly according to the amplitude of the respective preceding cycle in order to maintain the amplitude of the sawtooth voltage pulses automatically constant with varying duration or time periods as determined by synchronizing signals.

Yet, another object of the invention is to provide such a circuit arrangement in which, in case of a frequency variation of the synchronizing signal and thus of the sawtooth signal, the respective instantaneous voltage of the sawtooth signal, as determined by the slop of its leading flank, differs only by the variation of the duration in two successive cycles.

A further object of the invention is to provide such a circuit arrangement in which a value analogous and corresponding to the cycle of the synchronizing signal is formed by simple and reliable switching means and in the form of a voltage.

Yet, another object of the invention is to provide such a circuit arrangement in which this voltage is stored and is available in the next cycle of the synchronizing signal, and thus of the sawtooth signal, for controlling the charging current of the condenser used to produce the sawtooth voltage.

A further object of the invention is to provide such a circuit arrangement in which the condenser is fed during each cycle with a constant charging current whose amplitude, for this respective cycle, is determined by the duration of the respective preceding cycle or pulse.

Another object of the invention is to provide such a circuit arrangement in which the errors, appearing with relatively rapid frequency variations and thus rapid variations of the periodic time of oscillation of the synchronizing signal, in the instantaneous voltages of the sawtooth signals are negligibly small, by utilizing additional circuit means which add, to a cycle of the synchronizing signal, a differential voltage derived from this voltage and the voltage corresponding to the respective preceding cycle or pulse.

A further object of the invention is to provide such a circuit arrangement in which a certain "lead" is added to the variation of the slope of a sawtooth signal pulse, resulting from a current variation of the duration of the cycle, and whose amplitude depends on the relative variation of the duration from cycle-to-cycle of the synchronizing signal

BRIEF DESCRIPTION OF THE DRAWINGS

For an understanding of the principles of the invention, reference is made to the following description of a typical embodiment thereof as illustrated in the accompanying drawings.

DESCRIPTION OF THE PREFERRED EMBODIMENT

Figure 1:
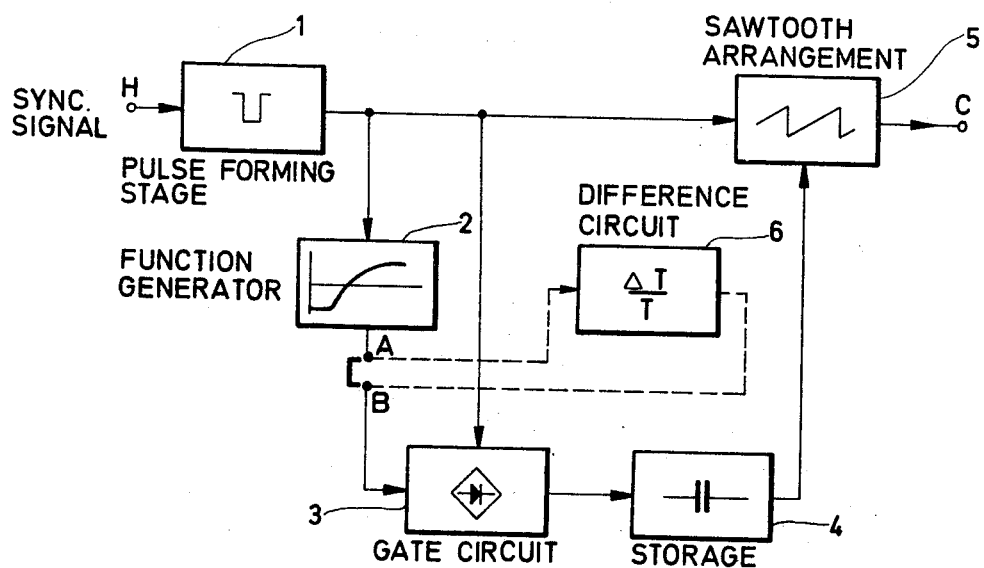
FIG. 1 is a block diagram of a circuit arrangement embodying the invention.

Referring to FIG. 1, a pulse forming stage 1 receives, at its input, the synchronizing signal $H$ and provides, at its output, pulses which are supplied to additional circuit means. The duration of the cycle determined by synchronizing signal $H$ is determined by two successive pulses. Pulses from pulse forming stage 1 are supplied to a function generator 2, a gate circuit 3 and a circuit arrangement 5 which forms the sawtooth signal proper. Function generator 2 forms a voltage course which is initiated by a first pulse and terminated by a second pulse supplied from pulse former stage 1. The voltage course or characteristic formed in function generator 2 by suitable circuit means has the form $u_R = U_1 - A/t$, where $U_1$ and $A$ are circuit-dependent constants, and $u_R$ is the instantaneous voltage appearing at any time. At the end of a cycle, that is, at the time $t=T$, when the respective second pulse from the pulse former stage 1 reaches function generator 2, there is an output voltage $U_R$ at the output of function generator 2 and which corresponds to the cycle time $T$. This voltage $U_R$ is supplied, through gate circuit 3 which transmits only during a pulse provided by pulse former stage 1, to storage 4 where the voltage is available during the entire following cycle. This voltage, accumulated at storage 4, now determines the amplitude of the charging current for the circuit means 5 which produces the sawtooth signal proper.

A circuit arrangement 6 may be provided between function generator 2 and gate circuit 3, and adds a certain voltage to the voltage $U_R$ at the output of function generator 2. This voltage, added by circuit arrangement or means 6, is determined by the difference of two voltages $U_{Rn}$ and $U_{Rn+1}$, at the output of function generator 2, and which correspond to the duration of two successive cycles of the synchronizing signal $H$.

Figure 2:
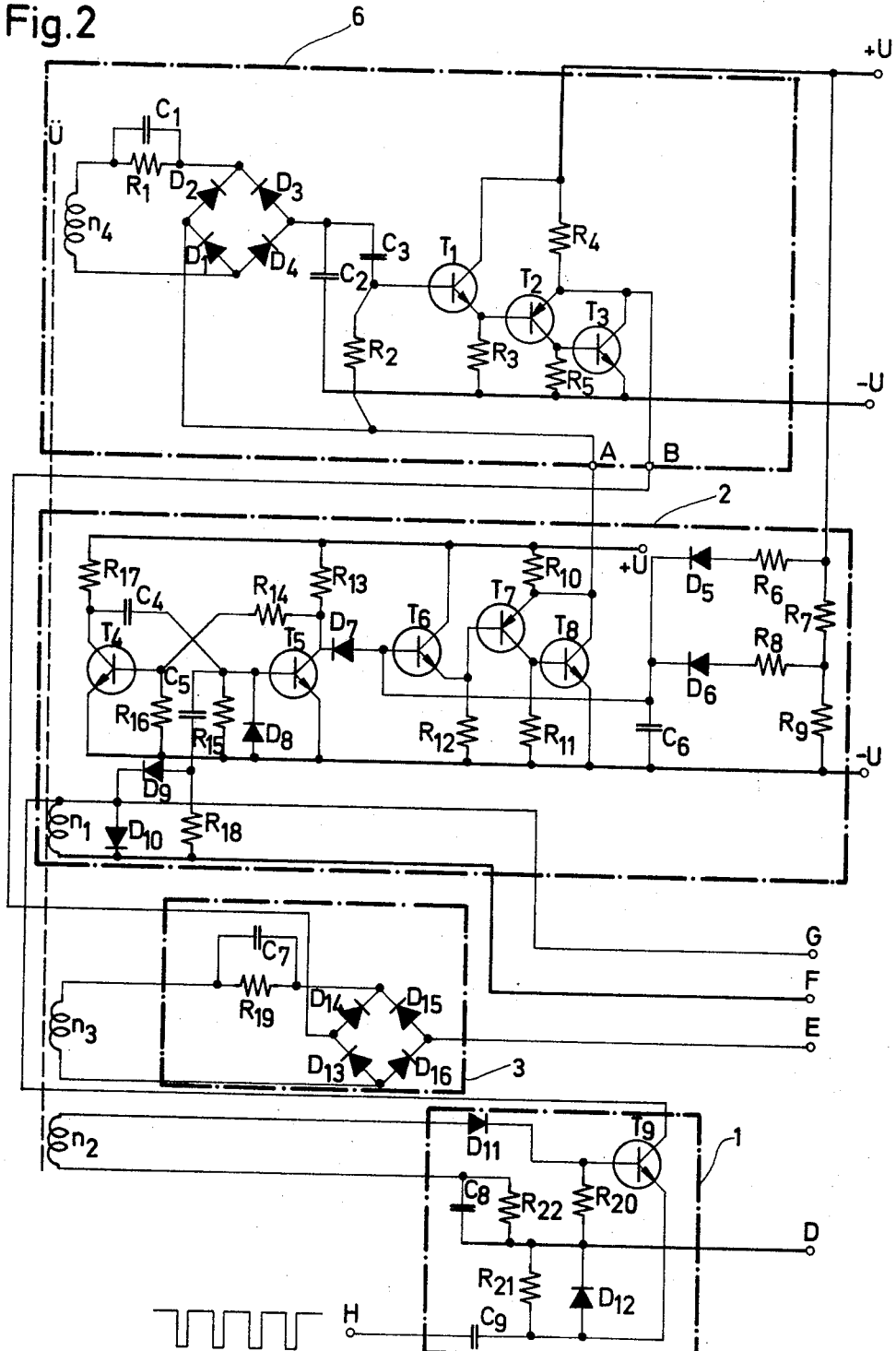
FIGS. 2 and 3, when placed side-by-side, form a schematic circuit diagram of an embodiment of the invention designed using semiconductor technology.
Figure 3:
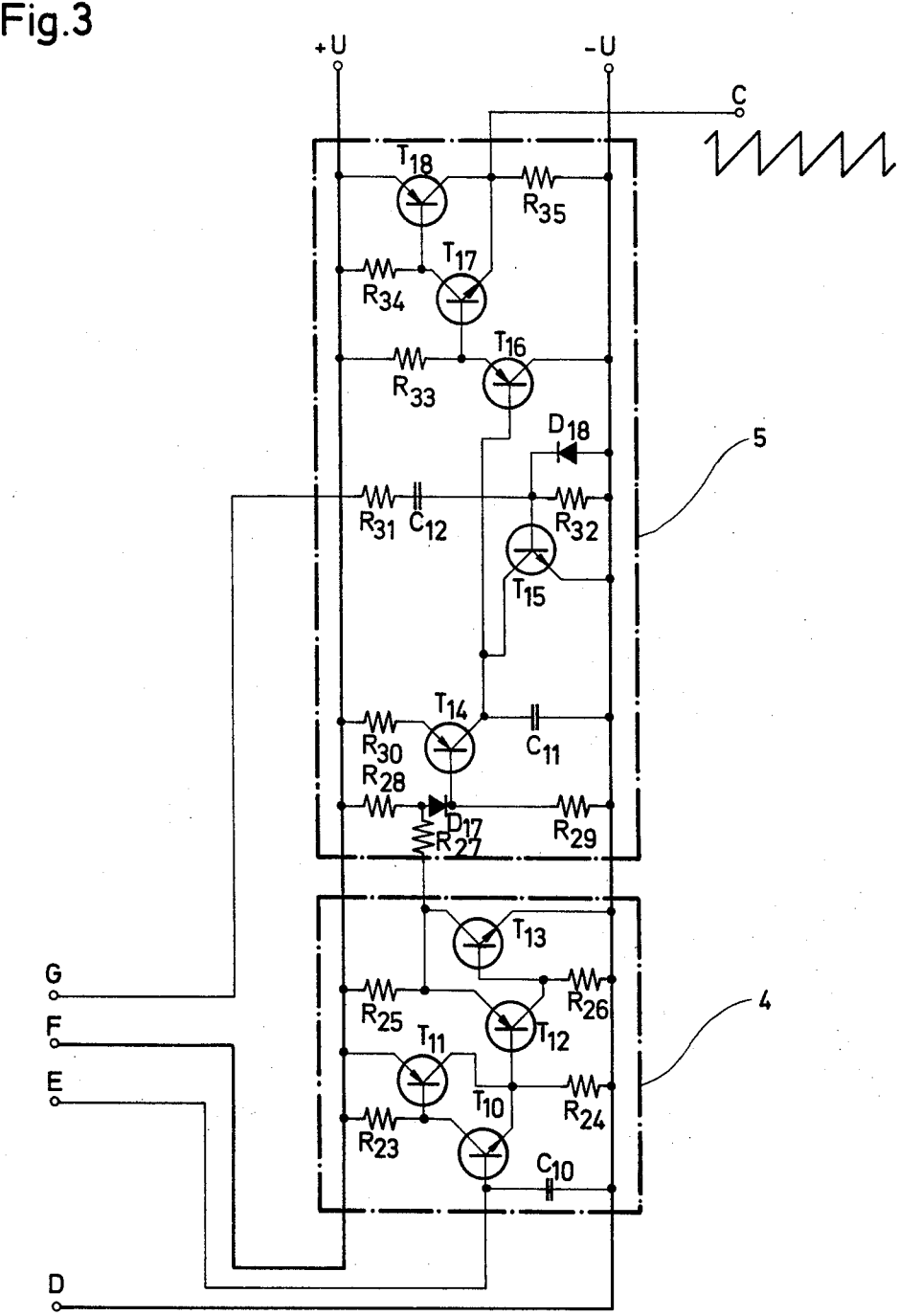

In the schematic diagram shown in FIGS. 2 and 3, the pulse former stage 1, illustrated in FIG. 2, includes a transistor $T_9$ whose emitter is controlled by synchronizing signal $H$. A winding $n_l$ of a transformer Ü is arranged in the collector circuit of transistor $T_9$, this winding being included in the block 2 as designated in FIG. 2. Transformer Ü has a winding $n_2$ connected in the base circuit of transistor $T_9$ and has additional windings $n_3$ and $n_4$. Gate circuit 3, which comprises diodes $D_{13}$, $D_{14}$, $D_{15}$ and $D_{16}$, is controlled by winding $n_3$, and winding $n_4$ controls another gate circuit, in block 6 of FIG. 2, comprising diodes $D_1$, $D_2$, $D_3$ and $D_4$.

A negative pulse of synchronizing signal $H$ appearing at the emitter of transistor $T_9$ triggers this transistor conductive, and transistor $T_9$ is kept conductive through windings $n_1$ and $n_2$ of the transformer and which are connected, respectively, in the base circuit and in the collector circuit. Transistor $T_9$ is maintained conductive until the magnetism of the core of transformer Ü is reversed. As a result of this reversal, a pulse appears at winding $n_1$ and, during the duration of this pulse, the charge of condenser $C_5$ (function generator 2) is reversed through diode $D_9$. The pulse at winding $n_1$ reverses the magnetism of the core of transformer Ü.

Upon reversal of the magnetism of the transformer core, transistor $T_9$ is triggered nonconductive or to a blocking state, and the thus recharged condenser $C_5$ triggers conductive a transistor $T_5$ whose base is connected to condenser $C_5$. Together with a transistor $T_4$, transistor $T_5$ forms a monostable multivibrator which, after a short time, returns to its stable position in which transistor $T_4$ conducts and transistor $T_5$ blocks. During the short time in which transistor $T_5$ is conductive, a condenser $C_6$ is discharged through diode $D_7$ and the collector-emitter circuit of transistor $T_5$. During the longer blocking time of transistor $T_5$, condenser $C_6$ is charged through a resistance combination consisting of resistors $R_6$, $R_7$, $R_8$ and $R_9$ and diodes $D_5$ and $D_6$. These resistors R6—R9 are so dimensioned that the voltage formed during the charging of condenser $C_6$ corresponds to the function $u_R = U_1 - A/t$.

Momentarily neglecting the switching arrangement 6, and considering the points A and B of FIG. 2 as being directly connected, the voltage charged on condenser $C_6$ is applied, through an impedance transformer consisting of transistors $T_6$, $T_7$ and $T_8$, to the input of gate circuit 3. This gate circuit 3 is formed by diodes $D_{13}$, $D_{14}$, $D_{15}$ and $D_{16}$. During the succeeding conductive period of transistor $T_9$, responsive to the succeeding negative synchronizing pulse, gate circuit 3 is opened by a pulse appearing across winding $n_3$. Thereby the voltage charged on condenser $C_6$ is applied to condenser $C_{10}$, shown in FIG. 3, which performs the function of storage 4.

The voltage charged on condenser $C_6$ is applied to condenser $C_{10}$ through a circuit including the impedance transformer composed of transistors $T_6$, $T_7$ and $T_8$ to the point A and thence, if points A and B are interconnected, as shown in FIG. 1, to point B and subsequently through gate circuit 3 and point E to condenser $C_{10}$, as shown in FIG. 3. On the other hand, if points A and B are not directly interconnected, the voltage charged on condenser $C_6$, as applied to point A, is applied through the gate circuit of component 6, composed of diodes $D_1$, $D_2$, $D_3$ and $D_4$ to condensers $C_2$ and $C_3$ and, from these condensers, through another impedance transformer composed of transistors $T_1$, $T_2$ and $T_3$ to point B and thence, as described above, to condenser $C_{10}$.

During the cycle initiated by the opening effected by this last pulse, the voltage stored on condenser $C_{10}$ is applied, through an impedance transformer consisting of transistors $T_{19}$, $T_{11}$, $T_{12}$ and $T_{13}$, to the base of a transistor $T_{14}$. A condenser $C_{11}$ is connected in the collector circuit of transistor $T_{14}$ and serves to produce the sawtooth voltage. Condenser $C_{11}$ is charged through transistor $T_{14}$ with a current which is constant during each cycle, and the value of this current is determined by the amplitude of the respective voltage applied to the base of transistor $T_{14}$. The voltage characteristic across condenser $C_{11}$ is made available, through an additional impedance transformer consisting of transistors $T_{16}$, $T_{17}$ and $T_{18}$, at the outputs C, as the sawtooth signal proper.

Condenser $C_{11}$ is bridged by the collector-emitter circuit of a transistor $T_{15}$, whose base is connected through a condenser $C_{12}$ and a resistor $R_{31}$ with winding $n_1$ of transformer Ü. Through resistor $R_{31}$ and a diode $D_{18}$, and the base-emitter circuit of transistor $T_{15}$, respectively, condenser $C_{12}$ is so recharged periodically that it triggers transistor $T_{15}$ conductive, through the base of the latter, during the conductive period of transistor $T_9$ and thus with the appearance of a pulse at winding $n_1$. Condenser $C_{11}$ is abruptly discharged through the collector-emitter circuit of the opened transistor $T_{15}$, that is, during the appearance of a pulse. This discharge corresponds, in each case, to the rear flank of a sawtooth voltage pulse whose front flank is determined by charging of condenser $C_{11}$ effected through resistor $R_{30}$ and transistor $T_{14}$.

The switching circuit 6, shown in FIG. 2 as connected between the points A and B, operates in the following manner. At the end of each cycle, that is, during the opening or triggering conductive of transistor $T_9$, a gate circuit, consisting of diodes $D_1$, $D_2$, $D_3$ and $D_4$, is opened through windings $n_4$. Thereby, a condenser $C_2$ is charged to the voltage at point A, which corresponds to the duration of the respective immediately preceding cycle. If the duration of the immediately preceding cycle is designated $T_n$, condenser $C_2$ is charged to a voltage $U_{Rn}$ corresponding to this duration. During the next cycle, having the duration $T_{n+1}$, the gate circuit remains blocked so that voltage $U_{Rn}$ is stored unchanged in condenser $C_2$.

At the base of transistor T1, which base is also connected with point A, there appears the voltage $U_{Rn+1}$ of functional generator 2 whose output voltage, at the end of this cycle, has the value $U_{Rn-1}$. Before the gate circuit consisting of diodes $D_1 - D_4$ is again opened at the end of the cycle having the duration $T_{n+1}$, by brief opening or conductivity of transistor T9, a voltage $\Delta U_{Rn+1} = U_{Rn+1} - U_{Rn}$ appears on condenser C3. When the gate circuit is opened, condenser C2 is charged very rapidly to the voltage $U_{Rn+1}$ which corresponds to the duration $T_{n+1}$. Thus the voltage $\Delta U_{Rn+1}$ stored additionally in condenser C3 is applied to the base of transistor T1 in addition to the voltage $U_{Rn+1}$. Transistor T1 comprises part of an impedance transformer including transistors T2 and T3. Thus, a voltage $U'_{Rn+1} = U_{Rn+1} + k \cdot \Delta U_{Rn+1}$ appears at gate circuit 3 through point B. In the immediately preceding equation, $k$ is a circuit-dependent constant.

Due to the provision of switching circuit 6 connected between points A and B, a voltage $\Delta U_R$ is added to the voltage $U_R$, corresponding to the respective duration of the cycle, with voltage $\Delta U_R$ corresponding to the respective variation of the durations of two successive cycles. This assures that, in case of a frequency variation, that is, a variation of the duration of several successive cycles, the control of the leading or rising flank of a sawtooth signal pulse receives a certain lead. Any error resulting in the determination of the size of the slope of the sawtooth signal pulse in accordance with the duration of the respective preceding cycle is thus reduced in the sense of the anticipated variation of the duration between two successive cycles.

This has the result that the indication of the angular position of a missile rotating about its own axis, and which is necessary for certain missile guiding procedures, is given with sufficient accuracy by the respective instantaneous values of a linear sawtooth voltage, even in the case of a variation of the rotational frequency. Any variation of the duration of the sawtooth voltage, caused by variation of the rotation of frequency of the missile, effects a variation of the slope of the sawtooth voltage so that its instantaneous value is equal for all cycles for any value between 0 and $2\pi$ of a cycle, independent of the duration.

Figure 4:
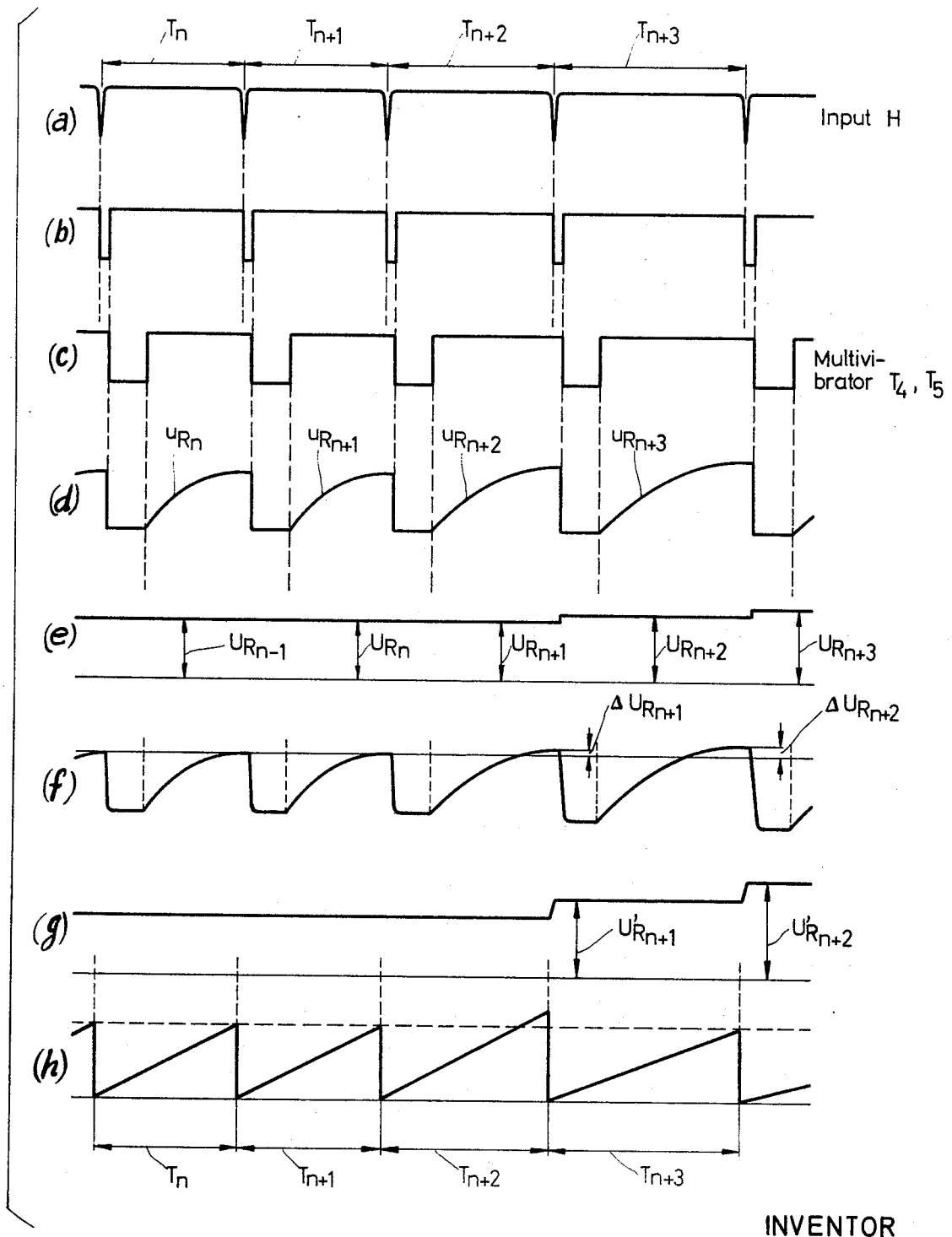
FIGS. 4a through 4h are waveform timing diagrams of the embodiment of the invention illustrated in FIGS. 1, 2 and 3.

Referring to the pulse or waveform diagrams shown in FIG. 4a—4h, FIG. 4a the first line illustrates the pulses transmitted to the input H of the pulse forming stage 1, and which are emitted, for example, with every full revolution of a missile rotating about its longitudinal axis, and through the medium of a corresponding gyroscope. Pulse forming stage 1 transforms these input pulses into narrow rectangular pulses as illustrated in FIG. 4b, and these narrow rectangular pulses serve to control various components of the circuit arrangement and which are coupled through windings $n_1$, $n_3$ and $n_4$ of transformer Ü which includes the winding $n_2$ of pulse former stage 1.

FIG. 4c illustrates the rectangular signal appearing at the output of the multivibrator comprising transistors $T_4$ and $T_5$. As can be seen, transistor $T_5$ conducts during a relatively short time, while the multivibrator is in its unstable state, so that condenser $C_6$ is discharged through the then conducting transister $T_5$ and the diode $D_7$. If, after expiration of this relatively short time, the multivibrator switches back to its stable state, in which transistor $T_4$ is conducting and transistor $T_5$ is blocked, then condenser $C_6$ is no longer short circuited through transistor $R_5$.

The voltage $u_R$, appearing across condenser $C_6$, is illustrated in FIG. 4d. As can be seen from the time correlation with the signal shown in FIG. 4c, condenser $C_6$ is discharged during the unstable state of the multivibrator, and it is charged after the stable state of the multivibrator is reached, according to a certain function which is determined by function generator 2 comprising diodes $D_5$, $D_6$ and resistors $R_6$, $R_7$, $R_8$ and $R_9$.

As will be noted the multivibrator comprising transistors $T_4$ and $T_5$ is switched to an unstable state again upon appearance of the rear flank of a new rectangular pulse at winding $n_1$, whereby condenser $C_6$ is again discharged. Upon appearance of the front flank of each rectangular pulse, as shown in FIG. 4b, there are opened, simultaneously, gate circuit 3 comprising diodes and the gate circuit in component 6, owing to which the peak voltage $U_R$ attained at condenser $C_6$ is applied to condenser $C_2$. The voltage available at condenser $C_2$ is shown in FIG. 4e.

Independently of the opening of the gate circuit contained in component 6, the voltage available at all times at condenser $C_6$ is applied, through the impedance transformer comprising transistors $T_6$, $T_7$ and $T_8$, through the point A and through resistor $R_2$ to condenser $C_3$, at which the voltage shown in FIG. 4f appears. When condenser $C_6$ is discharged, there is formed at condenser $C_3$, as viewed from point A, the same voltage as at condenser $C_2$ but with an opposite sign, so that the voltage rising at condenser $C_6$ is then drawn continuously. Upon occurrence of each rectangular pulse, therefore, there is available, at condenser $C_3$, precisely a voltage which corresponds to the difference of the voltages produced, during two successive period durations, at condenser $C_6$. The period durations of period $n$ and of the following period $n+1$ are exactly equal so that, as will be noted from FIG. 4f, the voltage appearing at condenser $C_3$ when a rectangular pulse occurs at the end of the periods is exactly equal to zero.

With the occurrence of each rectangular pulse, the voltage available at condenser $C_2$, plus the voltage just then available at condenser $C_3$, is applied, through the impedance transformer comprising transistors $T_1$, $T_2$ and $T_3$, through point B, and through gate circuit 3 to condenser $C_{10}$ shown in FIG. 3. This voltage, occurring at condenser $C_{10}$, is shown in FIG. 4g.

With further reference to FIGS. 4a—4h the period durations of the third period n+2 therein illustrated and of the fourth period n+3 are longer than the first two period durations. For this reason, also the voltages $U_{Rn+2}$ and $U_{Rn+3}$, produced through the function generator at condenser $C_6$ during these period durations, are greater than the voltages $U_{Rn}$ and $U_{Rn+1}$, produced in the preceding period durations. Therefore, these larger voltages are present at condenser $C_2$, as can be seen from FIG. 4e. Since the third period n+2 is thus longer than the second period n+1, and the fourth period n+3 longer than the third period n+2, there appears, upon occurence of a rectangular pulse at the end of the third period, at condenser $C_6$, the voltage attained at the end of the second period or, respectively, the difference of the voltage attained at the end of the fourth period and the voltage attained at the end of the third period. These difference voltages $\Delta U_R$ are illustrated in FIG. 4f.

The voltage applied to condenser $C_{10}$, upon occurrence of a rectangular pulse at the end of the third period and at the end of the fourth period, consequently is greater not only by the amount by which the voltage at condenser $C_6$ at the end of the third or fourth period has increased as compared with preceding periods, but also by the additional voltage amount available at condenser $C_3$ upon occurrence of a rectangular pulse. By this added additional voltage quantity, there is attained that, at a continuous variation of successive periods, a certain "reserve" is produced. This takes into consideration that the sawtooth voltage pulse just emitted normally shows a slope which is determined according to the duration of the preceding periods. This behavior of the circuit arrangement is illustrated in FIG. 4h which shows the sawtooth voltage emitted at the output C of the circuit arrangement.

As can be seen from FIG. 4h, the voltage configuration emitted during the first period n and the second period n+1 are identical and the end values have exactly the specified amplitude. On the other hand, the voltage configuration emitted during the third period n+2 attains a somewhat higher amplitude, as the rise time of this signal still depends on the duration of the immediately preceding period n+1, and therefore coincides therewith, although the length of period n+2 is already greater than that of the preceding period. Due to the "reserve" becoming operative at the end of the third period n+2, as shown in FIG. 4h, the emitted sawtooth voltage again attains exactly its specified configuration during the fourth period n+3.

If component or circuit arrangement 6 were not present, as if terminals A and B were directly interconnected, then, although the slope of the sawtooth signal emitted during the fourth period n+3 would be smaller than that of the sawtooth signal emitted during the third period n+2, the amplitude of the sawtooth signal occurring during the fourth period n+3, would still be greater than the desired amplitude, since also the length of the fourth period is greater than that of the third period.

While a specific embodiment of the invention has been shown and described in detail to illustrate the application of the principles of the invention, it will be understood that the invention may be embodied otherwise without departing from such principles.

I claim:

1. In circuitry for producing a sawtooth voltage, of constant amplitude and variable slope of the leading flanks of the sawtooth pulses, by charging and discharging a condenser:
   a circuit arrangement automatically maintaining constant the amplitude of the sawtooth voltage pulses despite varying variation of cycles determined by successive synchronizing signals applied to the input of said circuitry, said circuit arrangement comprising in combination, first circuit means having said synchronizing signals applied to its input and producing output voltages $U_R$ corresponding to the respective durations $T$ of cycles between successive synchronizing signals;
   second circuit means, including a gate circuit having its input connected to said first circuit means, and storage means connected to the output of said gate circuit and operable to store the output voltage $U_R$ produced during a respective cycle; and
   third circuit means connected to said first and second circuit means and controlling the charging current of said condenser, during each cycle $T_n$, as a function of the amplitude of the stored output voltage $U_R$ produced during the immediately preceding cycle $T_{n11}$ of said synchronizing signals, n being a whole number designating a base cycle; whereby the sawtooth signal pulse emitted during each cycle is controlled in proportion to the length of the immediately preceding cycle $T_{n11}$ between successive synchronizing signals.

2. A circuit arrangement, as claimed in claim 1, including fourth circuit means connected to said first and second circuit means and deriving, from the output voltage $U_R$, corresponding to a cycle $T_n$ between the synchronizing signals, and the output voltage $U_{Rn11}$, corresponding to the immediately preceding cycle $T_{n1t}$ between the synchronizing signals, a differential voltage $\Delta U_{Rn}$ and adding said differential voltage $\Delta U_{Rn}$ to said output voltage $UR$.

3. A circuit arrangement, as claimed in claim 1 in which said first circuit means, providing an output voltage $U_R$ corresponding to the cycle $T$ between said synchronizing signals, includes a monostable multivibrator; and a second condenser connected to said multivibrator and having its charging controlled by said multivibrator to produce a charge voltage $u_R = U_1 - A/t$, in which $U_1$ and $A$ are circuit constants and $t$ is the instantaneous value of the charging time of said second condenser.

4. A circuit arrangement, as claimed in claim 3, including fourth circuit means connected to said first and second circuit means means connected to said first and second circuit means and deriving, from the output voltage $U_R$ corresponding to a cycle $T_n$ between the synchronizing signals, and the output voltage $U_{Rn11}$, corresponding to the immediately preceding cycle $T_{n11}$ between the synchronizing signals, a differential voltage $\Delta U_{Rn}$ and adding said differential voltage $\Delta U_{Rn}$ to said output voltage $U_R$.

5. A circuit arrangement, as claimed in claim 1, in which said third circuit means comprises a solid state current device controlling the charging current of said first-mentioned condenser, and a transistor conducting the discharge current of said first-mentioned condenser and connected in parallel with said first-mentioned condenser.

6. A circuit arrangement, as claimed in claim 5, in which said first circuit means, providing an output voltage $U_R$ corresponding to the cycle $T$ between said synchronizing signals, includes a monostable multivibrator; and a second condenser connected to said multivibrator and having its charging controlled by said multivibrator to produce a charge voltage $u_R = U_1 - A/t$, in which $U_1$ and $A$ are circuit constants and $t$ is the instantaneous value of the charging time of said second condenser.

7. A circuit arrangement, as claimed in claim 6, including a transformer having a magnetizable core and a plurality of windings on said core; said first circuit means including a pulse forming stage having said synchronizing signals applied to its input and including a second transistor having an electrode connected to the input of said pulse forming stage and connected by a feedback circuit to first and second windings of said transformer; said monostable multivibrator comprising a pair of third transistors and being connected to said first transformer winding for control by the latter; a third condenser connected to said multivibrator and periodically charged and discharged by said multivibrator, a fourth condenser; a first impedance transforming means, consisting of a plurality of transistors, and a first gate circuit, consisting of a plurality of diodes and connected to a third winding of said transformer for control by said third winding, connecting said fourth condenser to said multivibrator; said multivibrator, responsive to a pulse corresponding to a synchronizing signal, transferring the charge of said third condenser to said fourth condenser for storage in said fourth condenser; a second impedance transforming means consisting of a plurality of transistors connecting said fourth condenser with the base of a fourth transistor controlling the charging current of said first-mentioned condenser producing the sawtooth voltage; the collector-emitter circuit of said first transistor being connected in parallel with said first-mentioned condenser, and the base of said transistor being connected to said first winding of said transformer; said first transistor being triggered conductive briefly responsive to a pulse of said synchronizing signals being applied to its base by said first winding; a sawtooth voltage output terminal included in said third circuit means; and a third impedance transforming means, consisting of a plurality of transistors, connecting said first-mentioned condenser to said sawtooth voltage output terminal to provide sawtooth voltage pulses at said sawtooth voltage output terminal.

8. A circuit arrangement, as claimed in claim 7, including fourth circuit means connected to said first and second circuit means and deriving, from the output voltage $U_R$, corresponding to a cycle $T_n$ between the synchronizing signals, and the output voltage $U_{Rn11}$, corresponding to the immediately preceeding cycle $T_{n11}$, between the synchronizing signals, a differential voltage $\Delta U_{Rn}$ and adding said differential voltage $\Delta U_{Rn}$ to said output voltage $U_R$.

9. A circuit arrangement, as claimed in claim 8, in which said fourth circuit means includes an input terminal, a second gate circuit, consisting of a plurality of diodes, connected to said last-named input terminal, a fourth winding of said transformer connected to and controlling said second gate circuit and a fifth condenser connected to the output of said second gate circuit; said fifth condenser storing the voltage applied to said last-named input when said second gate circuit is opened; a fourth impedance transforming means, consisting of a plurality of transistors including a fifth transistor as its input; a sixth condenser connecting the base of said fifth transistor to said fifth condenser; means connecting the base of said fifth transistor to said last-named input terminal; said sixth condenser being charged with the voltage difference between the voltage stored in said fifth condenser and the instantaneous voltage at said last-name input terminal; an output terminal connected to the last transistor of said fourth impedance transforming means, whereby a voltage which is the sum of the voltage difference charged on said sixth condenser and the voltage stored in said fifth condenser is applied to said last-named output terminal during opening of said second gate circuit and through said fourth impedance transforming means; said last-named input terminal being connected with the output of said first impedance transforming means and said last-named output terminal being connected with the input of said first gate circuit; whereby said fourth circuit means is interposed between the output of said first impedance transforming means and the input of said first gate circuit.